United States Patent
Knoop

(10) Patent No.: US 7,174,164 B1
(45) Date of Patent: Feb. 6, 2007

(54) METHOD AND SYSTEM FOR AUTOMATICALLY TRACKING PHONE CELLS

(75) Inventor: Dale Knoop, Leawood, KS (US)

(73) Assignee: Sprint Spectrum L.P., Overland Park, KS (US)

(*) Notice: Subject to any disclaimer, the term of this patent is extended or adjusted under 35 U.S.C. 154(b) by 138 days.

(21) Appl. No.: 10/757,612

(22) Filed: Jan. 12, 2004

(51) Int. Cl.
*H04M 3/42* (2006.01)
(52) U.S. Cl. .............. 455/414.1; 455/556.1; 455/405
(58) Field of Classification Search .......... 455/414.1, 455/556.1, 556.2, 56.6, 405, 406, 550.1; 379/121.04, 121.05, 126, 114.01
See application file for complete search history.

(56) References Cited

U.S. PATENT DOCUMENTS 6,775,772 B1 * 8/2004 Binding et al. ............ 713/171

2005/0043065 A1 * 2/2005 Bekanich .................. 455/566

FOREIGN PATENT DOCUMENTS

EP 1028578 A2 * 8/2000

* cited by examiner

*Primary Examiner*—Melur Ramakrishnaiah

(57) ABSTRACT

A method and system provides for detecting completion of a call and responsively presenting a user of a client station with information about the call and a prompt requesting the user to categorize the call. In one embodiment, the client station can then receive from the user, in response to the prompt, a categorization of the call and can then automatically transmit from the client station to a network server, via a radio access network, a record of the call, including the categorization.

17 Claims, 9 Drawing Sheets

| Record No. | Date | Time | Phone No. | Incoming or Outgoing | Name | Duration (minutes) | Category |
|---|---|---|---|---|---|---|---|
| 1 | 12/02/03 | 10:57 | 123-456-7891 | Incoming | John Doe | 2 | Business |
| 2 | 12/02/03 | 13:22 | 888-123-4567 | Outgoing | ABC Corporation | 3 | Business |
| 3 | 12/03/03 | 07:32 | 111-222-3333 | Outgoing | Jane Doe | 1 | Personal |
| 4 | 12/03/03 | 19:19 | 222-333-4444 | Outgoing | XYZ Corporation | 22 | Business |
| ... | ... | ... | ... | ... | ... | ... | ... |

Fig. 5

| Name | Phone No. | Category |
|---|---|---|
| ABC Corporation | 888-123-4567 | Business |
| Company X | 777-654-3210 | Business |
| Doe, Jane | 111-222-3333 | Personal |
| Doe, John | 123-456-7891 | Business |
| ... | ... | ... |

Fig. 6

| Caller name |
| Call duration |
| Called number |

Fig. 10

| Caller Tracker |
|---|
| Call Stats: |
| Called number |
| Call duration |
| Business |
| Personal |
| |
| Exit |

Fig. 11

| Caller Tracker |
|---|
| Sending |
| Call Stats . . . . |
| |
| Exit |

Fig. 12

| Caller Tracker |
|---|
| Sending |
| Complete |
| |
| Exit |

Fig. 13

METHOD AND SYSTEM FOR AUTOMATICALLY TRACKING PHONE CELLS

BACKGROUND

1. Field of the Invention

The present invention provides a method and system for tracking telephone calls, and more particularly, a method and system for automatically tracking telephone calls according to categories.

2. Background

It might be advantageous to categorize calls or to distinguish one or more calls from another call or calls. For example, business travelers commonly use their mobile phones to place both business and personal calls. In many cases, that business traveler (or, generally, another phone user) might want to distinguish the business calls from the other calls, for expense reporting and/or reimbursement, for example. To do so, the phone user might need to review his or her phone bill and somehow mark or otherwise distinguish those calls that were business related from those calls that were not.

Disadvantageously, when reviewing the phone bill, the phone user has to somehow associate each and every person or company he or she called (or each and every entity from which the user received a call) as business related or otherwise. This process can be quite time consuming and potentially inaccurate. Some users can make or receive hundreds, if not thousands, of calls each month. Remembering each and every business related call at the time a phone user receives his or her phone bill can be unnecessarily cumbersome and difficult.

Thus, there is a need to provide a mechanism to help entities, such as phone users, automatically track telephone calls.

SUMMARY

The present invention provides a mechanism to help entities track telephone calls. Embodiments can advantageously facilitate expense reporting by allowing one to easily and simply categorize telephone calls as, for example, business or personal.

According to an exemplary embodiment, a client station, such as a mobile phone or other telecommunication device, can include program logic that can run in the background and can wait for a user to hang up after completing a phone call. When a user hangs up, the program logic might automatically interface with other logic on the phone to determine data such as the call duration, the name of the other party, and the telephone number of the other party (where the name and number might be indicated by caller-ID information and/or by reference to a local phone book entry). The program can then present the call data to the user and can then prompt the user to categorize the call (for example, as business or personal). After the user categorizes the call, the program can then automatically transmit a record of the call, including the call data and the categorization, to a network server for later reference.

This program logic advantageously allows a user to categorize and make records of telephone calls in real time. One can later conveniently refer to the categorized call records to facilitate generation of expense reports or for other purposes.

A variety of alternatives will become apparent to those skilled in the art upon review of the following detailed description.

BRIEF DESCRIPTION OF THE DRAWINGS

Exemplary embodiments of the present invention are described herein with reference to the drawings, in which:

FIG. 5 is an exemplary call record table in accordance with an exemplary embodiment;

FIG. 6 is an exemplary phone book data table in accordance with an exemplary embodiment;

FIG. 10 is an illustration of an exemplary client station interface;

FIG. 11 is an illustration of an exemplary client station interface;

FIG. 12 is an illustration of an exemplary client station interface; and

FIG. 13 is an illustration of an exemplary client station interface.

DETAILED DESCRIPTION OF EXEMPLARY EMBODIMENTS

1. EXEMPLARY GENERAL NETWORK ARCHITECTURE

Figure 1:
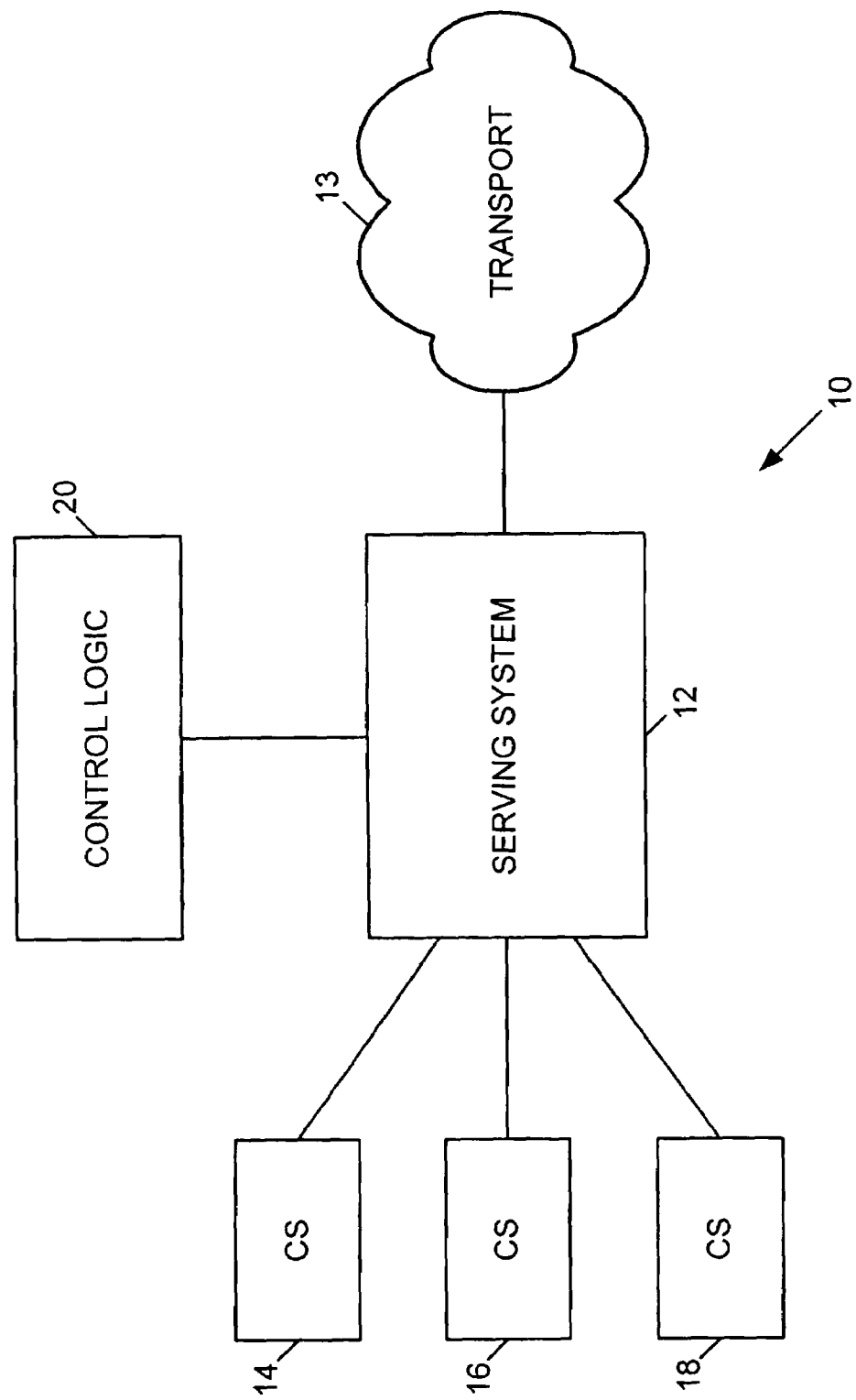
FIG. 1 is a generalized block diagram of an exemplary communication system.

Referring to the drawings, FIG. 1 illustrates a generalized block diagram of a communication system 10 in which an exemplary embodiment of the present invention can be employed. System 10 is shown to include a serving system 12, which might be coupled to one or more transport networks 13, such as the public switched telephone network ("PSTN"), the Internet, and/or another packet switched network or IP network, for instance. Serving system 12 might serve a plurality of client stations, three of which are shown by way of example as client stations 14, 16, and 18. Further, serving system 12 might include and/or have access to control logic 20. In one example, control logic 20 can generally function to authorize communication to or from the client stations 14, 16, and 18 via serving system 12 and can therefore function to allow or disallow communication with the client stations 14, 16, and 18 in accordance with the exemplary embodiment.

Figure 2:
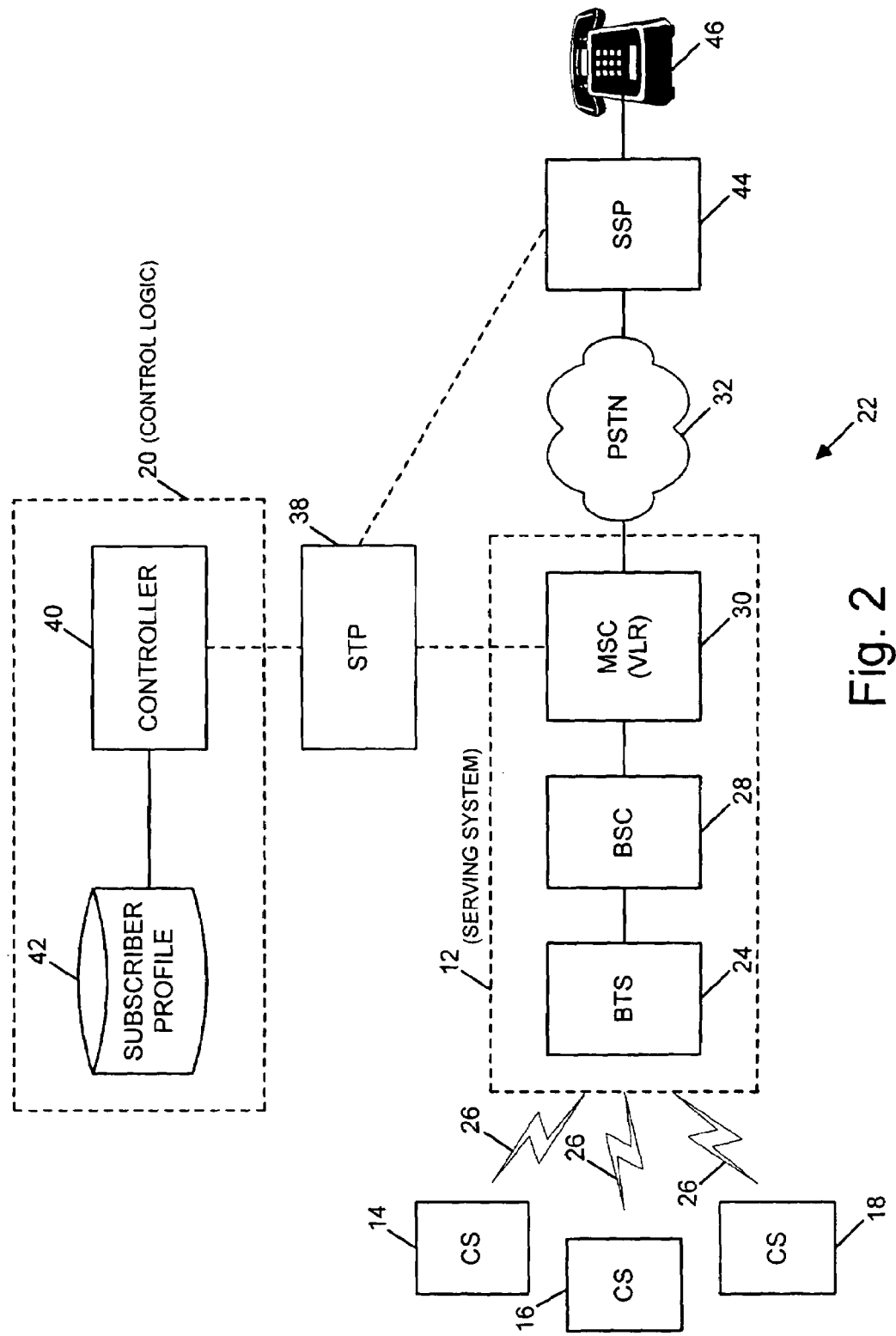
FIG. 2 is a block diagram depicting an example implementation of an exemplary communication system.

The generalized arrangement of FIG. 1 can be implemented in a variety of forms. Referring to FIG. 2, for example, the arrangement may take the form of a wireless telecommunication network 22. At least a portion of the wireless network 22 might be owned and/or operated by a telecommunication service provider.

As shown in FIG. 2, the serving system 12 of the wireless network 22 may include a base transceiver station ("BTS") 24, which, in this example, functions to establish a radiation pattern that defines a cell site (not shown). The client stations 14, 16, and 18 may then operate in the cell site and communicate with the BTS 24 via an air interface 26.

A client station, such as the client stations 14, 16, and 18, might communicate with the BTS 24 using any of a variety of different protocols. For instance, in a time division multiple access ("TDMA") system, each BTS 24 typically communicates on a group of frequencies, and each frequency may itself carry at least one multiplexed call. In a code division multiple access ("CDMA") system, by comparison, each BTS 24 communicates over a spread spectrum of frequencies, and the spectrum may carry many multiplexed calls. Typical components for CDMA systems include those described in the TIA standard ANSI/TIA/EIA-95-B-99, entitled "Mobile Station-Base Station Compatibility Standard for Wideband Spread Spectrum Cellular Systems," dated Feb. 3, 1999, which is incorporated herein by reference in its entirety. The Global System for Mobile Communications ("GSM") or another method may also or alternatively be used.

Regardless of the specific protocol, the BTS 24 might then be coupled to a base station controller ("BSC") 28, which might then be coupled with a mobile switching center ("MSC") 30. The MSC 30 might then provide connectivity with the PTSN 32. Other arrangements of the BTS 24, the BSC 28, the MSC 30, and the PTSN 32 are possible, as well.

As further illustrated, the MSC 30 can be coupled to a signaling system, represented by a signal transfer point ("STP") 38. The STP 38 can in turn be coupled to a controller 40, which may include a home location register ("HLR") and/or a service control point ("SCP"). In this example, the controller 40 might maintain or otherwise have access to a subscriber profile store 42, which might set forth parameters defining services, attributes, locations, and states of subscribers and terminals. Further, the controller 40 may embody or have access to an authentication control function.

Also connected to PSTN 32 may be other switches, which may serve other subscriber stations, whether landline or wireless. For instance, as shown in FIG. 2, a Class 5 landline switch 44, also known as a service switching point ("SSP"), may be coupled to the PSTN 32 and may serve a landline telephone station 46. The SSP 44 can be coupled to the STP 38 to facilitate signaling communication between the MSC 30 and the SSP 44, and to facilitate signaling communication between the SSP 44 and the controller 40, for instance.

Each of the client stations 14, 16, and 18 can be hard-coded with a unique electronic serial number ("ESN"), which might have been programmed into each client station when it was manufactured and which might be initially activated by the service provider. In doing so, the service provider can assign a unique mobile identification number ("MIN") to each client station and might establish, in the profile store 42, a record or other profile associating the MIN with the ESN and indicating service parameters for the subscriber (i.e., for the MIN).

To appreciate how the exemplary embodiment of the invention might operate, it is instructive to first review how some conventional signaling works to facilitate operation of a client station, such as client station 14, for instance.

When client station 14 is first powered on in, or moves into, the cell defined by the BTS 24, the client station 14 may send a system access or registration message via the air interface to the BTS 24. The registration message might carry a parameter that identifies the client station's ESN and MIN. The message might pass from the BTS 24 to the BSC 28 and in turn to the MSC 30. The MSC 30 might then forward the message via the STP 38 to the controller 40, and might also identify the location (e.g., the identity of the MSC 30) where the client station 14 is operating. The controller 40 might then responsively validate the client station 14 by ensuring that the MIN and ESN are listed together in the subscriber profile store 42. Further, the controller 40 might set a flag in the profile 42 for that MIN to indicate that the client station 14 is operating in the location indicated. Additionally, the controller 40 might send a local version of the client station's subscriber profile via the STP 38 to the MSC 30 to be stored in a visitor location register ("VLR").

When client station 14 seeks to originate a voice call to a directory number on PSTN 32, the client station 14 can conventionally send an origination message via air interface 26 to BTS 24, and the message can in turn pass to the BSC 28 and then to the MSC 30. The origination message can conventionally carry a parameter identifying the client station's ESN and MIN. When the MSC 30 receives the message, it can validate the request by reference to the local subscriber profile 42 for the MIN, as provided by the controller 40. Alternatively, it can send an origination-request message via the STP 38 to the controller 40, and the controller 40 can validate the request by reference to the subscriber profile 42 for the MIN and then notify the MSC 30 of the successful validation. (The MSC 30 and/or the controller 40 might also apply various supplemental services, such as number translation or call blocking, for instance).

With successful validation, the MSC 30 might then set up the client station's call to the directory number via PSTN 32, typically employing industry standard ISDN User Part ("ISUP") signaling for instance. For example, assuming that the dialed digits correspond to the landline telephone 46, the MSC 30 might engage in ISUP signaling communication with the SSP 44, to set up the call between the client station 14 and the landline station 46. When a call path is available, the switches can then connect the call and communication may begin.

Different signaling can occur when the wireless network 22 receives a request to terminate (i.e., to connect) a voice call to client station 14. Assume, for instance, that a user at the landline telephone 46 seeks to place a voice call to client station 14 by dialing the directory number of client station 14, which might be the MIN of the client station 14. The SSP 44 can then receive the dialed digits and may then engage in ISUP signaling communication via the STP 38 with the MSC 30, and may then ask the MSC 30 to set up a call to the MIN. Conventionally, this signaling communication would not identify the ESN of the client station 14.

When the MSC 30 receives the request to terminate the voice call to the designated MIN, the MSC 30 can first confirm by reference to its local profile store (e.g., the VLR) that the MIN is located in its service area. The MSC 30 might also send a termination-request message via the STP 38 to the controller 40, and the controller 40 might apply supplemental services to the call attempt (such as blocking the call, for instance). The MSC 30 might then signal to the BSC 28 to send a MIN-based termination message over the air interface 26, and the BSC 28 can cause the BTS 24 to broadcast the MIN-based termination message over the air interface 26.

In a CDMA system compatible with industry standard IS-95 (EIA/TIA Interim Standard 95, entitled "Mobile Station-Base Station Compatibility Standard for Dual-Mode Wideband Spread Spectrum Cellular Systems," dated July 1993, which is incorporated herein by reference in its entirety), for instance, the MIN-based termination message can be a general page message, and the BTS 24 can broadcast the message on the paging channel of the sector in which the client station 14 is operating. The general page message may carry parameters that define, among other things, (i) the destination MIN; (ii) a traffic channel to which the client station 14 should tune so as to connect to the call; (iii) a directive (e.g., a BYPASS_ALERT_ANSWER (BAA) flag) for the client station 14 to tune to that traffic channel; and (iv) a directive (e.g., a CALL_ALERT_INDICATOR (CAI) flag) for the client station 14 to ring, so as to alert a user of the incoming call.

When client station 14 receives such a general page message, it can responsively enter the designated traffic channel and begin to ring. A user might then press the TALK button on the client station 14, which might then cause the client station 14 to complete the connection, allowing the user at the landline telephone 46 to talk with the user at the client station 14. Other examples are possible, as well.

Figure 3:
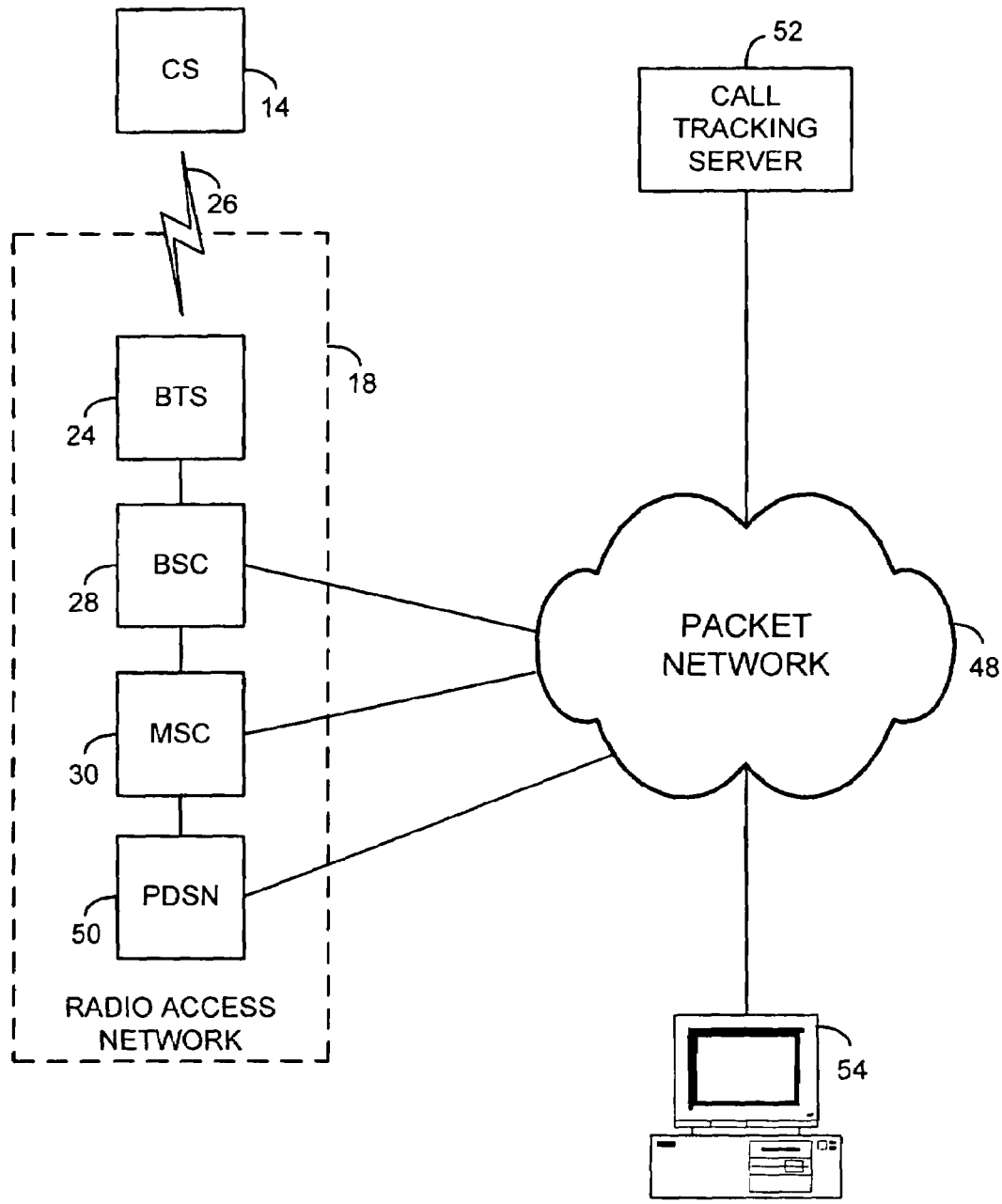
FIG. 3 is a block diagram depicting an example implementation of an exemplary communication system.

FIG. 3 depicts another example communication system in which an exemplary embodiment might be employed. As depicted in FIG. 3, the exemplary system can include one or more client stations, such as client station 14, for instance. In an exemplary embodiment, the term "client station" can refer to a wireless communication terminal. In practice, the wireless communication terminal could then be mobile, such as a traditional cellular phone for instance, or it could be a fixed wireless terminal, such as a wirelessly connected pay phone for instance. Other examples, such as a wirelessly connected computer, handheld personal digital assistant ("PDA"), gaming device, or global positioning satellite ("GPS") device, for example, are possible, as well.

Each client station 14 can be linked with a packet network 48 (e.g., an IP network) through a radio access network 18. As shown in FIG. 3, the radio access network 18 can include the BTS 24, the BSC 28, the MSC 30, and a packet data serving node ("PDSN") 50. In an exemplary embodiment, the radio access network 18 may form at least a portion of a telecommunication service provider's network. The radio access network 18 can provide wireless connectivity with the packet network 48, and such wireless connectivity can take any of a variety of forms.

In one embodiment, the BSC 28 and/or the MSC 30 can be coupled through the PDSN 50 or another gateway to the packet network 48. Conventionally, the client station 14 can acquire a radio link over air interface 26 to communicate with the BSC 28 and/or the MSC 30 and in turn with other entities via packet network 48. Further, as shown, BSC 28 and/or MSC 30 might have a more direct connection to the packet network 48, so that the BSC 28 and/or the MSC 30 can themselves engage in packet data communication over the packet network 48. Similarly, other radio access networks and PSTNs might be connected to the packet network 48 through other PDSNs or other gateways.

In the exemplary radio access network depicted in FIG. 3, the functional elements sometimes referred to as the BSC and the MSC are shown separated as different entities. It should be understood that these respective functional elements might instead reside as a single physical entity in the radio access network. Other examples are possible as well.

A number of other entities can reside on or be accessible through packet network 48. One such entity might include, by way of example, a call tracking server ("CTS") 52. The CTS 52 may be an HTTP compatible server that can receive call tracking information from a client station, such as client station 14, for example. In this case, the CTS 52 can function to send and/or receive HTTP messages, such as HTTP GET and HTTP POST messages. In another embodiment, one or more computing devices, such as a personal computer 54, may also reside on or be accessible through packet network 48, and may communicate with the CTS 52. Any number of other entities might also reside on or be accessible through packet network 48, as well.

The entities residing on or accessible through packet network 48 can be arranged in any of a variety of ways. For example, the CTS 52 might reside on a discrete database server that is coupled to IP network 48 and that is accessible by other network entities. Or the CTS 52 might reside within another network entity or entities. And as another example, the functions of CTS 52 might be integrated with the functions of another network entity. Other configurations are also possible.

In operation, each client station can engage in packet-data communication over the packet network 48 after acquiring a radio link over an air interface and a data link with a PDSN or other gateway. As described generally above, for instance, a client station, such as the client station 14, can send an origination message to a BSC, such as BSC 28, and/or an MSC, such as MSC 30, asking for a radio link for packet-data communication. The BSC can then responsively instruct the client station 14 to operate on a given traffic channel over the air interface 26. Through that traffic channel, the client station might then negotiate with a gateway, such as PDSN 50, to establish a data link such as a point-to-point protocol ("PPP") session. Further, the gateway and/or some other entity such as a mobile-IP home agent or AAA (authentication, authorization, and accounting) server (not shown) could assign an IP address to the client station 14 for use in communicating over the packet network 48.

Figure 4:
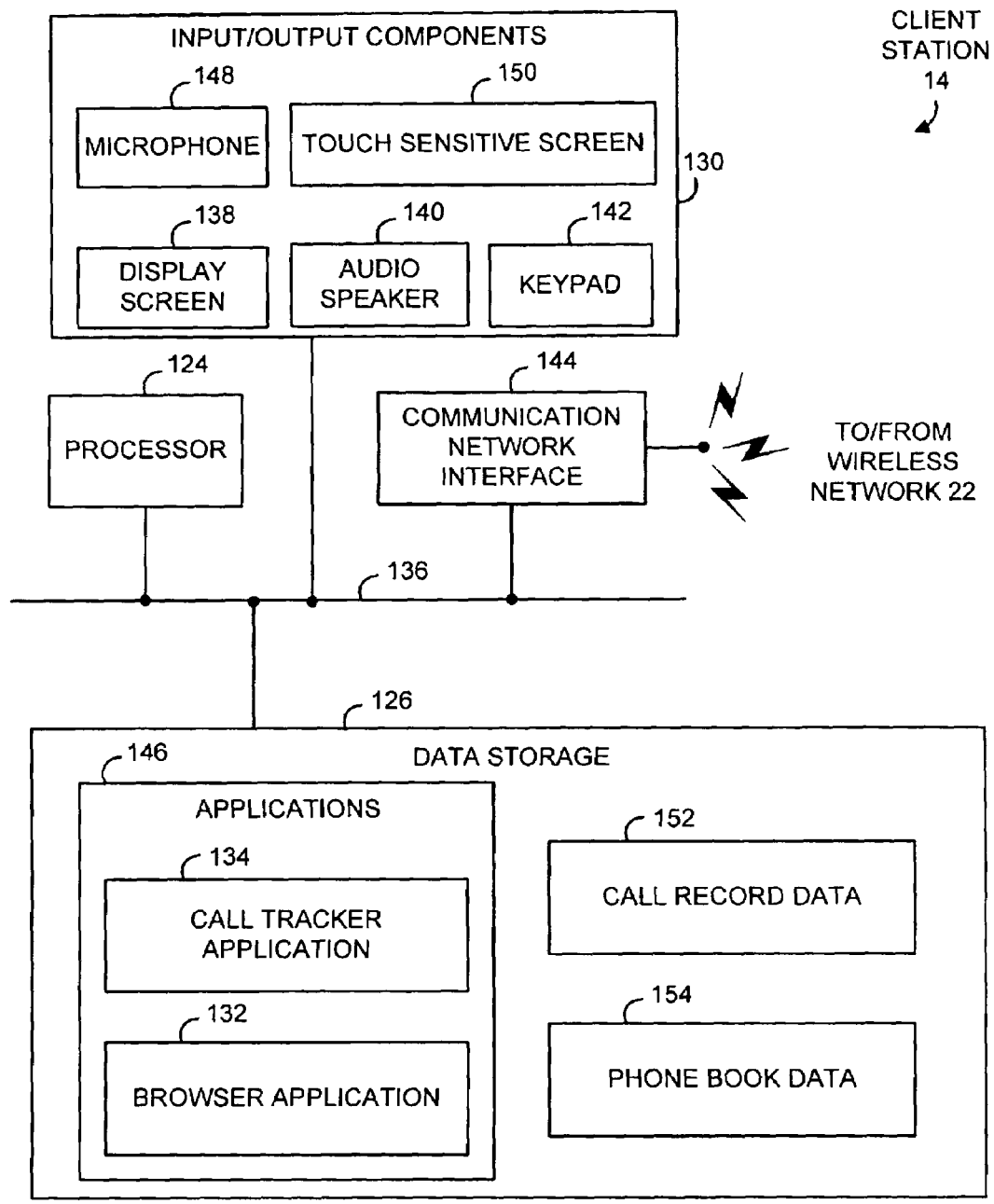
FIG. 4 is a block diagram illustrating exemplary components of a client station.

FIG. 4 is a block diagram showing components of an exemplary client station 14. An exemplary client station 14 might include a processor 124, data storage 126, and machine language instructions stored in the data storage 126. The machine language instructions can be executable by the processor 124 to perform various functions described herein. The machine language instructions might define applications 146 that might also be stored in the data storage 126. The client station 14 might also include a wireless network interface component 144, through which the client station 14 can communicate with a wireless telecommunication network 22. Further, the client station 14 might include input and output components 130. The various components of the client station 14 (including the processor 124, the data storage 126, the wireless network interface 144, and the input and output components 130) might be coupled together directly or via a system bus 136, for instance. Other arrangements are possible as well.

As shown by way of example in FIG. 4, the input and output components 130 might include a display screen 138, an audio speaker 140, a keypad 142, a microphone 148, and a touch sensitive screen 150. The client station 14 might also include other or additional input and/or output components, or the client station 14 might also have fewer input and/or output components than those shown in FIG. 4. In an exemplary embodiment, the client station 14 might have multimedia capabilities such as an ability to display video and play audio. In other embodiments, however, the client station 14 may not have multimedia capabilities, or the client station 14 may be capable of only playing audio or of only displaying video, or it might be limited in some other way, such as by not having a display screen 138 or an audio speaker 140.

The data storage 126 can store applications 146 that can be executed by the processor 124. The data storage 126 can also include data, such as a call record data store 152 and a phone book data store 154, for example. In alternative embodiments, one or more applications 146 (such as the call tracker application 134, for example) and/or data (such as the call record data store 152 and/or the phone book data store 154, for example) might not be stored in the client station 14. In such embodiments, applications 146 and/or data might be stored remotely on a network server, such as the CTS 52, for example. The remote network server can then be accessible to the client station 14, and the client station 14 may then access such applications 146 or data via the wireless network 22.

As shown in FIG. 4, the data storage 126 might include a call tracker application 134 and an HTTP-enabled browser application 132. The applications 146 might utilize the various input and output components 130 of the client station 14 and, thereby, interact with the user and/or allow the user to interact with the client station 14. For example, one or more applications might output video on the display screen 138; play audio on the speaker 140; receive input from the keypad 142, the touch sensitive screen 150, and/or the microphone 148; or perform a combination of these or other actions.

The HTTP-enabled browser application 132 might be an application suitable for requesting and receiving HTTP-based content. In one embodiment, the HTTP-enabled browser application 132 might be a Web browser suitable for use in a client station, such as the client station 14. In any case, browser application 132 might be capable of communicating with a server, such as the CTS 52, by sending information to the server via an HTTP POST message and by requesting information from the server via an HTTP GET request. Other examples are also possible.

The call tracker application 134 in turn might be an application that can track and/or categorize calls made by the client station 14. For example, the call tracker application 134 might track information about calls, such as the telephone number called and the call duration, for example. The call tracker application 134 might then associate (through input from the user, for example) the call with one or more categories. In an exemplary embodiment, the call tracker application 134 might receive input from the user, such as an identification of a category of a call, through one or more input components 130 of the client station 14. For example, a user might identify a category for a call via the client station's touch sensitive screen 150, the microphone 148, and/or the keypad 142. The call tracker application 134 may also provide call information to the user of the client station 14 via the display screen 138 or the audio speaker 140 of the client station 14.

Further, the call tracker application 134 might store call information. In an exemplary embodiment, the call tracker application 134 can store call information in a call record data store 152, which might be a part of the data storage 126 of the client station 14. The stored call information might include records of telephone calls, and the stored call information might also associate the records of telephone calls with a particular category, such as business or personal, for example. Other examples are possible as well.

FIG. 5 depicts an exemplary table of call record data that can be stored in the call record data store 152 by the call tracker application 134. As depicted in FIG. 5, each record is depicted as a row in the exemplary data table, and each record might in turn include a plurality of fields (which are depicted as columns). The table depicted in FIG. 5 is merely an example, and other embodiments of a call record data table might include fewer, more, and/or different records or fields. Further, the entries included in the call record table are examples only.

Turning back to FIG. 4, in an exemplary embodiment, the call tracker application 134 might interface with or include a phone number storage application, such as a phone book data store 154. The phone book data store 154 might store phone numbers and might then, in one embodiment, associate those phone numbers with particular categories. For example, the phone book data store 154 might maintain a list of phone numbers (in a look-up table, for example), and the phone book data store 154 might then associate each phone number with one or more particular categories. In another example, the phone book data store 154 might maintain a list of MINs or ESNs (in a look-up table, for example), and the phone book data store 154 might then associate each MIN or ESN with one or more particular categories. Other examples are possible as well.

In one embodiment, the phone book data store 154 may include one or more tables, such as the exemplary table depicted in FIG. 6. As depicted in FIG. 6, the phone book data table might include one or more records, or rows, and each record might in turn include a plurality of fields, or columns. The table depicted in FIG. 6 is merely an example, and other embodiments of a phone book data store might include fewer, more, and/or different records or fields. Further, the entries included in the phone book data store are examples only. In any case, the phone book data store 154 might be programmed by the user of the client station 14, or the client station 14 might include functionality that updates the phone book data store 154 in response to a call made or received by the client station 14. Other examples are possible as well.

Turning back to FIG. 4, after the client station 14 engages in a phone call, the call tracker application 134 might then interact with the phone book data store 154. In such an embodiment, the call tracker application 134 might look up the phone number the client station 14 called (or the number of the device that called the client station 14) and determine whether that number is already associated with any categories. If so, the call tracker application 134 might then include those categories in the record of the phone call that the call tracker application 134 might store or might transmit.

In any case, in one embodiment, the call tracker application 134 might then interface with the browser application 132 to send call information to a network server, such as the CTS 52. For example, the call tracker application 134 might send to the CTS 52 (via an HTTP POST message, for example) call record data for one or more phone calls, for example. In such a case, the CTS 52 might maintain call record information containing data similar to the call record table of FIG. 5, and the CTS 52 might associate such call record information with a particular client station 14.

In one embodiment, the call tracker application 134 can send call information to the CTS 52 automatically upon completion of a call. In such a case, the call tracker application 134 might send a record of the call and the associated categorization of the call to the CTS 52 upon completion of the call. In another embodiment, the call tracker application 134 can send the record and an associated record ID of the call upon completion of the call, and can later send the categorization of the call with the associated record ID. In still another embodiment, the call tracker application 134 can send both the record of the call and the categorization of the call at a later time.

In an exemplary embodiment, the call tracker application 134 can also interface with the browser application 132 to request information (such as archived call record data) from a network server, such as the CTS 52. The call tracker application 134 can request information from the CTS 52 via an HTTP GET request, for example.

Figure 7:
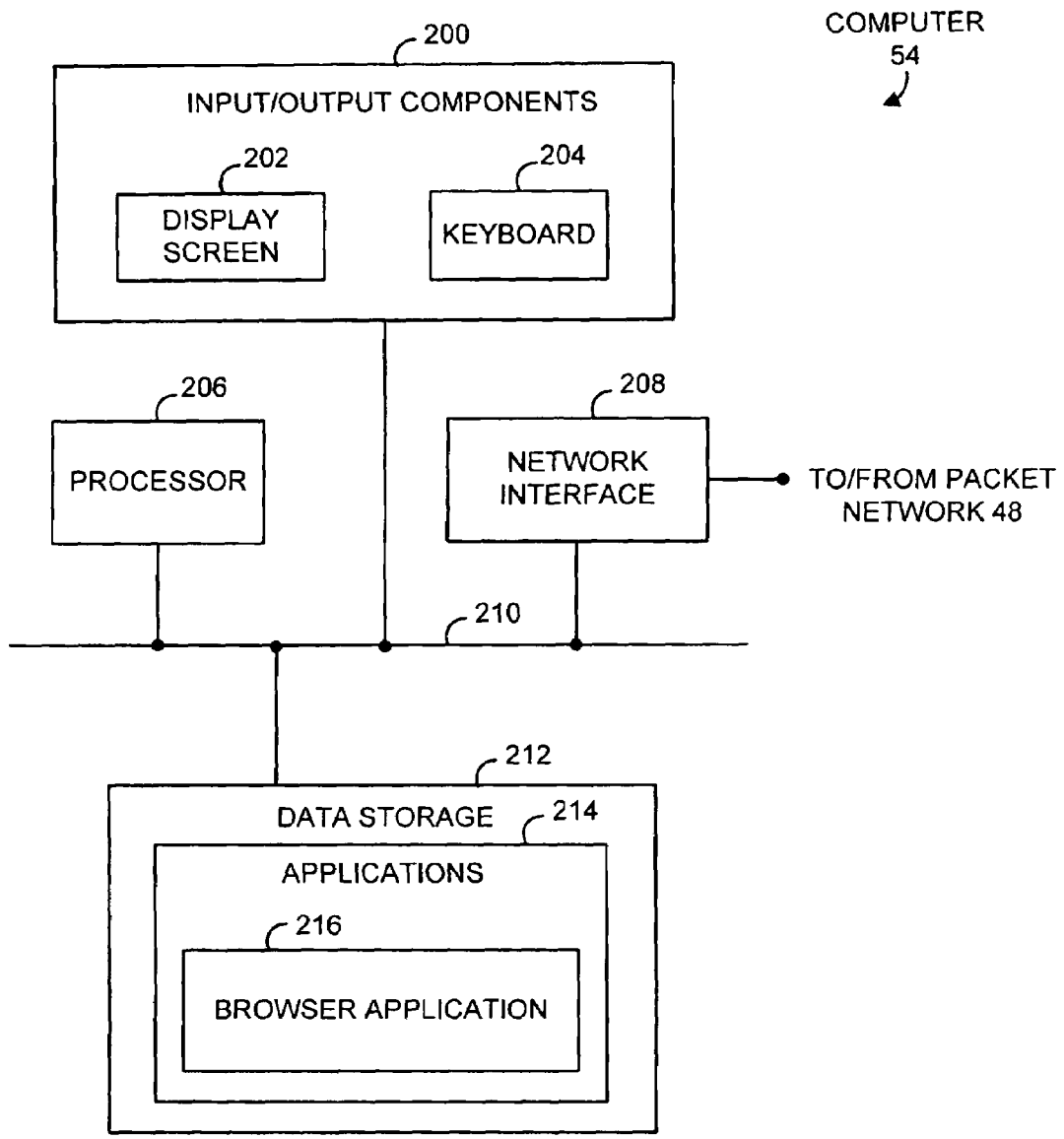
FIG. 7 is a block diagram illustrating exemplary components of a computer.

FIG. 7 is a block diagram showing components of an exemplary computer, such as the computer 54 shown in FIG. 3. The computer 54 may be any computing device, other than the client station 14, that is capable of requesting and/or viewing call tracking data.

As shown in FIG. 7, the computer 54 might include a processor 206, data storage 212, and machine language instructions stored in the data storage 212 and executable by the processor 206 to carry out various functions described herein. The machine language instructions might define applications 214 that might also be stored in the data storage 212. The computer 54 might also include a network interface component 208 through which the computer 54 might communicate with the packet network 48, for instance. Further, the computer 54 might include input and output components 200. The various components of the computer 54 (including the processor 206, the data storage 212, the network interface 208, and the input and output components 200) might be coupled together directly or via a system bus 210, for instance. Other arrangements are possible as well.

As further shown in FIG. 7, the input and output components 200 might include a display screen 202 and a keyboard 204. The computer 54 may have other or additional input or output components, or the computer 54 might also have fewer input or output components 200 than those shown in FIG. 7.

Applications 214 might be stored in the data storage 212 and executed by the processor 206. In an exemplary embodiment, the data storage 212 might contain a browser application 216. The browser 216 might be an application suitable for requesting and receiving HTTP-based content. In an exemplary embodiment, the HTTP-enabled browser application 132 might be a typical Web browser or an enhancement of a typical Web browser. In any case, the browser application 216 might be capable of viewing phone call tracking data from a server, such as the CTS 52, communicating on the packet network 48. Other examples are also possible.

Referring back to FIG. 3, the computer 54 and the CTS 52 might communicate over the packet network 48. In other embodiments, the computer 54 might communicate with the CTS 52 over another public or private network. The computer 54 might connect to the packet network 48 in any number of ways. The computer 54 might use a network interface 208, such as a network interface card ("NIC"), to connect to a local area network ("LAN"), for instance. The LAN, in turn, might provide connectivity to the packet network 48 through an Internet service provider ("ISP") or another gateway. Alternatively, the computer 54 might connect to a private intranet or to another network that might provide connectivity to the packet network 48. Further, the computer 54 might connect directly to the packet network 48 without connecting through a LAN. In other embodiments, the computer 54 might also connect to the packet network 48 using a wireless access network.

Figure 8:
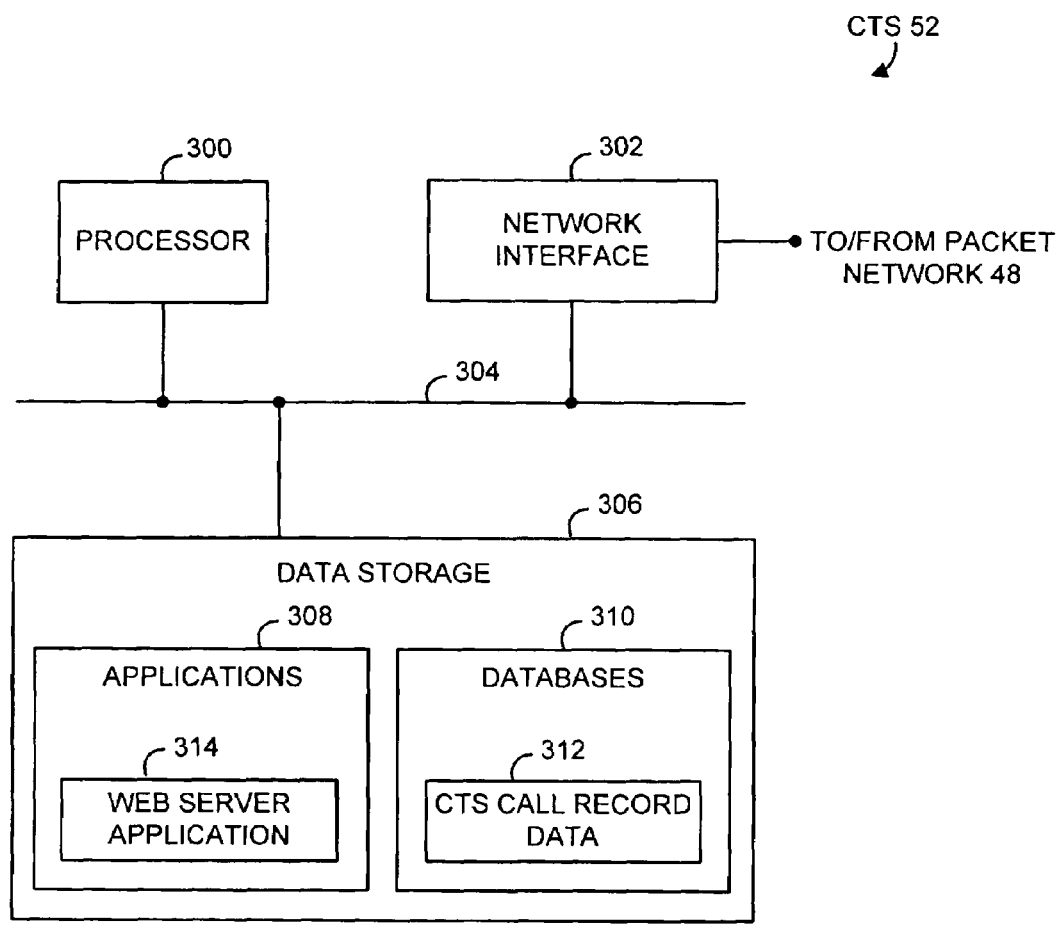
FIG. 8 is a block diagram illustrating exemplary components of a server.

FIG. 8 is a block diagram showing components of an exemplary call tracking server, such as the CTS 52 shown in FIG. 3. As shown in FIG. 8, the CTS 52 might include a processor 300, data storage 306, and machine language instructions stored in the data storage 306 and executable by the processor 300 to carry out various functions described herein. The machine language instructions might define applications 308 that might also be stored in the data storage 306. The CTS 52 might also include a network interface component 302 through which the CTS 52 might communicate with the packet network 48, for instance. The various components of the CTS 52 (including the processor 300, the data storage 306, and the network interface 302) might be coupled together directly or via a system bus 304, for instance. Other arrangements are possible as well.

The data storage 306 of CTS 52 might include any number of databases 310 (or other files of information) for, among other things, facilitating the storage of phone call records. In one embodiment, the data storage 306 might include a CTS call record data store 312. The CTS call record data store 312 might include a plurality of records containing information similar to the records depicted in FIG. 5 and described above. The CTS call record store 312 might further include a field identifying a particular client station that corresponds to each record, and/or might group each set of records to correspond to a particular client station. In another embodiment, each call record might be stored as a file in the data storage 306 and might not correspond to a record in a database. Other examples or arrangements are possible as well.

In an exemplary embodiment, the data storage 306 might reside on the CTS 52. In other embodiments, some or all of the data in data storage 306 might reside on other devices. In such a case, each data storage device may communicate with the CTS 52 via a link such as a TI, IEEE 488, or Ethernet link, for example.

In one embodiment, a given phone call record or a group of phone call records might be stored as one or more files in the data storage 306 (for example, in the CTS call record database 312). Upon request, the CTS 52 might then send the data representing the call record data to the client station 14 or to the computer 54. Other examples are possible as well.

The data storage 306 might also include one or more applications 308, which might include a Web server application 314. In an exemplary embodiment, the Web server application 314 generally might allow users to interact with the CTS 52 from computing devices such as the client station 14 or the computer 54. For example, a user might use the Web browser application 216 on the computer 54 (as depicted in FIG. 7) to access the Web server application 314 and to view call records on the CTS 52. The Web server application 314 might support other methods of access, as well.

The CTS 52 might connect to the packet network 48 through any type of network, such as a LAN. The CTS 52 might connect to the LAN using a network interface 202, such as a NIC, and the LAN, in turn, might provide connectivity to the packet network 48 through an ISP or another gateway. Alternatively, the CTS 52 might connect to a private intranet (e.g., a core packet network of a wireless service provider) or to another network that provides connectivity to the packet network 48. Further, the CTS 52 might connect directly to the packet network 48 without connecting through a LAN. The CTS 52 might also wirelessly connect to the packet network 48.

It should be understood, however, that all the arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

2. EXEMPLARY OPERATION

Figure 9:
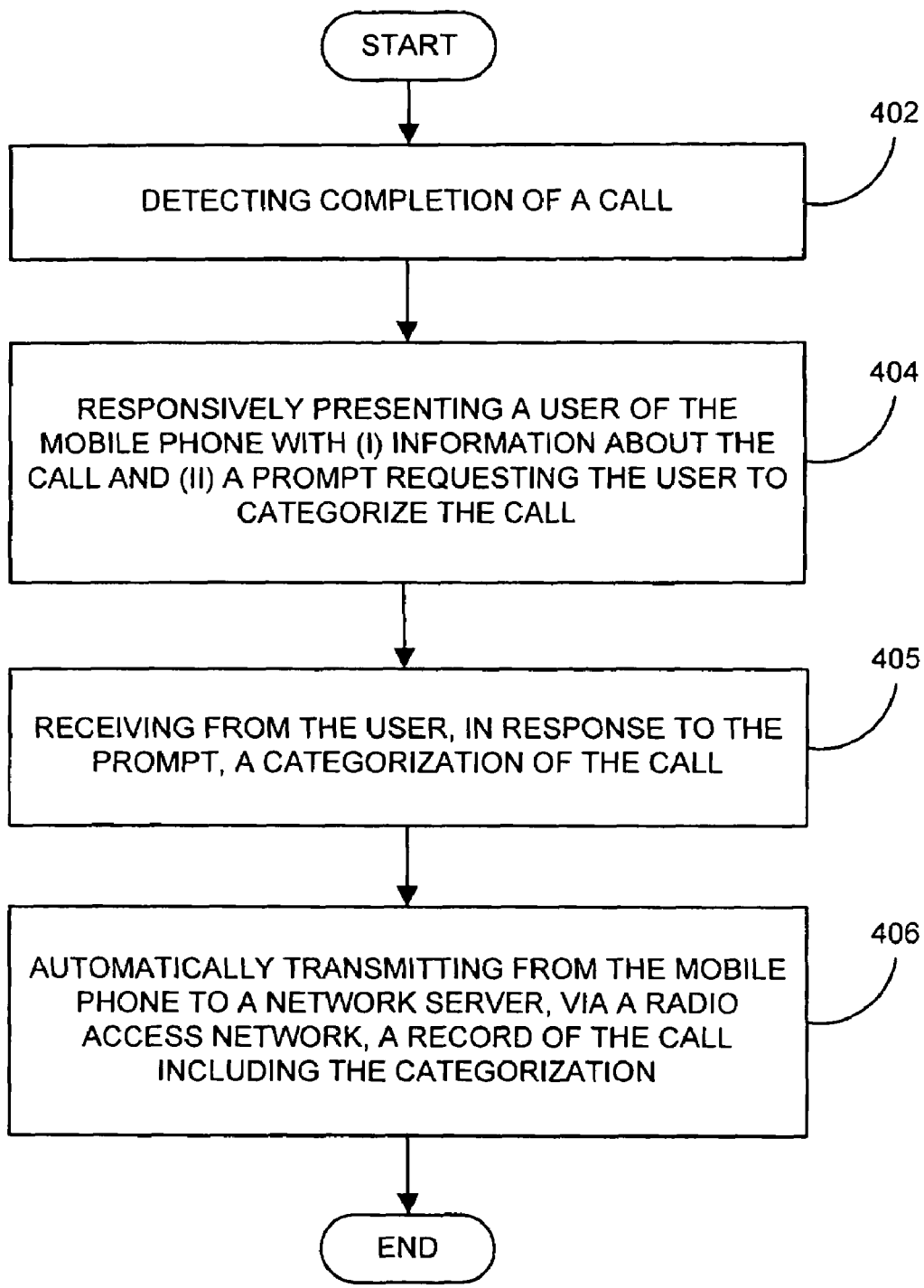
FIG. 9 is a flowchart illustrating a process carried out by a system in accordance with an exemplary embodiment.

FIG. 9 is a flowchart that depicts functions that may be involved in categorizing calls made or received by a client station 14 in communication with the wireless telecommunication network 22 of FIGS. 1–4.

At step 402 of FIG. 9, a telecommunication entity, such as the client station 14, for example, can detect the completion of a call. In an exemplary embodiment, a call tracking application, such as the call tracker application 134, can run in the background of the client station 14 during a phone call and can detect the completion of the phone call. The call tracker application 134 might also track the duration of the phone call, or upon the user completing the call, the call tracker application 134 might interface with other components of the client station 14 to determine the call duration, as well as other call data such as the name and phone number of the other party. Other examples are possible as well.

At step 404 of FIG. 9, a telecommunication entity, such as the client station 14, for example, in response to detecting the completion of a call, can present the user of the client station 14 with certain information. In one embodiment, the client station might, on the display screen 138, for example, present the user with information about the just-terminated call. The client station 14 might also present the user with a prompt requesting the user to categorize the call. Other examples are possible as well. In one embodiment, the client station 14 can invoke an application, such as the call tracker application 134, for example, to present this information to the user.

FIG. 10 depicts an interface that the client station 14 might present to a user at the end of a call before the client station 14 has invoked the call tracker application 134. As depicted in FIG. 10, an exemplary end-of-call interface might include the name of the person called, the duration of the call, and the number called. Other examples are possible as well.

FIG. 11 depicts an interface that the client station 14 might present to a user at the end of a call after the client station 14 has invoked the call tracker application 134. As depicted in FIG. 11, a call tracker interface might include the number called, the name of the person called (not shown), the duration of the call, and, in one embodiment, a prompt that might allow the user to categorize the call in a particular category, such as "business" or "personal," for example. Other examples are possible as well.

The client station 14 can present available categories to the user in any number of ways. In one embodiment, the client station 14 can present available categories to the user on the client station's display screen 138, for example. As another example, the client station 14 can present available categories to the user on the client station's touch sensitive screen 150. As yet another example, the client station 14 can present available categories to the user via the client station's audio speaker 140. Still other examples are possible.

In step 406 of FIG. 9, an entity, such as the client station 14, for example, can receive from the user a categorization of the call. In one embodiment, the user can categorize the call by invoking or otherwise selecting one of the categories presented by the client station 14.

Turning back to FIG. 11, in one embodiment, the user can categorize the call by selecting a category, such as "business" or "personal," for example, by using the keypad 142. In another embodiment, the user can categorize the call by selecting a category, such as "business" or "personal," for example, by using the touch sensitive screen 150. In still another embodiment, the client station 14 may include voice recognition software, and the user can categorize the call by speaking the name of a category, such as "business" or "personal," for example, into the microphone 148. Other examples are possible as well.

At step 408 of FIG. 9, an entity, such as the client station 14, can automatically transmit from the client station 14 a record of the call, including the categorization. In one embodiment, the client station 14 can transmit a record of the call (including the categorization) to a network server, such as the CTS 52. Further, the client station 14 might transmit the call record via the radio access network 12. In one embodiment, one or more applications residing on the client station 14, such as the call tracker application 134 and/or the HTTP-enabled browser application 132 can function to transmit the call record. The client station 14 can then transmit the call record as an HTTP POST message. Other examples are possible as well.

FIG. 12 depicts an interface that the client station 14 might present to the user as the client station 14 is transmitting the record of a particular call. As depicted in FIG. 12, the call tracker application 134 might inform the user, via the display screen 138, that it is sending information to another entity, such as a network server or the CTS 52, for example.

FIG. 13 depicts an interface that the client station 14 might present to the user once the client station 14 has finished transmitting the record of a particular call. As depicted in FIG. 13, the call tracker application 134 might inform the user, via the display screen 138, that it has completed sending information. At this time, the user can then select the exit prompt and the client station 14 might then exit the call tracker application 134 and return to its normal display. Other examples are possible as well.

As indicated above, the user of the client station 14 might view call tracking information on the client station 14 itself. In one embodiment, the user might also view call tracking information at another computing device, such as the computer 54. In such an embodiment, the user might interface with the computer 54 via the computer's input/output components 200, such as the computer's display screen 202 and the computer's keyboard 204. In one embodiment, the user might use the computer's browser application 216 to access the CTS's 52 Web server application, via a Web site on the packet network 48, for example. In such a way, the user might access call tracking information at the user's convenience, for instance when the user is preparing expense reports (when the categorization of phone calls is particularly useful, for example).

3. CONCLUSION

Several exemplary embodiments of the present invention have been described above. Those skilled in the art will understand, however, that changes and modifications may be made to these embodiments without departing from the true scope and spirit of the present invention, which is defined by the claims.

I claim:

1. A method for tracking phone calls, comprising:
   detecting completion of a call;
   responsively presenting a user of a first client station with (i) information about the call and (ii) a prompt requesting the user to categorize the call, wherein the prompt presents the user with categorization choices of at least business and personal, and requests the user to select one of the choices as a categorization of the call as either business or personal;
   receiving from the user, in response to the prompt, a selection of either business or personal as the categorization of the call;
   transmitting from the first client station to a network server, via a radio access network, a record of the call and the categorization of the call; and
   displaying on a second client station one or more records of calls including the categorization of each call.

2. The method of claim 1, wherein the information about the call comprises call-duration information and call-participant information.

3. The method of claim 1, wherein the record of the call includes the categorization of the call.

4. The method of claim 1, wherein transmitting from the first client station to a network server, via a radio access network, a record of the call and the categorization of the call comprises:
   upon completion of the call, automatically transmitting from the first client station to the network server, via the radio access network, the record of the call including a record ID; and
   after transmitting one or more records of calls including the record ID of each call, transmitting from the first client station to the network server, via the radio access network, the record ID and the categorization of the call.

5. The method of claim 1, wherein the network server stores the record of the call and the categorization of the call, further comprising:
   requesting from the network server a stored record of the call and a stored categorization of the call;
   receiving at the first client station the stored record of the call and the stored categorization of the call; and
   displaying the stored record of the call and the stored categorization of the call received from the network server on the first client station.

6. The method of claim 5, wherein requesting from the network server the stored record of the call and the stored categorization of the call further comprises requesting from the network server the stored record of the call and the stored categorization of the call via an HTTP GET request.

7. The method of claim 1, wherein the record of the call and the categorization of the call are transmitted via an HTTP POST message.

8. A system comprising:
   a first client station; and
   a network server coupled to the first client station;
   wherein the first client station comprises a wireless communication interface, a display, a user-input mechanism, and program logic executable, in response to completion of a call, (i) to present on the display information about the call and a prompt requesting a user to categorize the call, wherein the prompt presents the user with categorization choices of at least business and personal, and requests the user to select one of the choices as a categorization of the call as either business or personal, (ii) to then receive via the user-input mechanism a selection of either business or personal as the categorization of the call, and (iii) to thereafter send to the network server, via the wireless communication interface, a record of the call and the categorization of the call;
   wherein the network server comprises program logic executable to store the record of the call and the categorization of the call; and
   wherein the system further comprises a second client station, the second client station comprising a display and program logic executable to present on the display one or more records of calls including the categorization of each call.

9. The system of claim 8, wherein the information about the call comprises call-duration information and call-participant information.

10. The system of claim 8, wherein the first client station further comprises program logic executable to (1) request from the network server a stored record of the call and a stored categorization of the call, (2) receive at the first client station the stored record of the call and the stored categorization of the call, and (3) display the stored record of the call and the stored categorization of the call received from the network server on the first client station.

11. The system of claim 10, wherein the first client station further comprises program logic executable to request from the network server the stored record of the call and the stored categorization of the call via an HTTP GET request.

12. The system of claim 8, wherein the record of the call and the categorization of the call are sent via an HTTP POST message.

13. A system comprising:
   a first client station and a second client station; and
   a network server coupled to the first and second client stations;
   wherein the first client station comprises a wireless communication interface, a display, a user-input mechanism, and program logic executable, in response to completion of a call, (i) to present on the display information about the call and a prompt requesting a user to categorize the call, wherein the prompt presents the user with categorization choices of at least business and personal, and requests the user to select one of the choices as a categorization of the call as either business or personal, (ii) to then receive via the user-input mechanism a selection of either business or personal as the categorization of the call, and (iii) to thereafter send to the network server, via the wireless communication interface, a record of the call and the categorization of the call;
   wherein the network server comprises program logic executable to store the record of the call and the categorization of the call; and
   wherein the second client station comprises a display and program logic executable to present on the display one or more records of calls and the categorization of each call.

14. The system of claim 13, wherein the information about the call comprises call-duration information and call-participant information.

15. The system of claim 13, wherein the first client station further comprises program logic executable to (1) request from the network server a stored record of the call and a stored categorization of the call, (2) receive at the first client station the stored record of the call and the stored categorization of the call, and (3) display the stored record of the call and the stored categorization of the call received from the network server on the first client station.

16. The system of claim 15, wherein the first client station further comprises program logic executable to request from the network server the stored record of the call and the stored categorization of the call via an HTTP GET request.

17. The system of claim 13, wherein the record of the call and the categorization of the call are sent via an HTTP POST message.

* * * * *

UNITED STATES PATENT AND TRADEMARK OFFICE
CERTIFICATE OF CORRECTION

| | | |
|---|---|---|
| PATENT NO. | : 7,174,164 B1 | Page 1 of 1 |
| APPLICATION NO. | : 10/757612 | |
| DATED | : February 6, 2007 | |
| INVENTOR(S) | : Dale Knoop | |

It is certified that error appears in the above-identified patent and that said Letters Patent is hereby corrected as shown below:

On the title page, at item [54], delete "Cells" and add -- Calls --.

Signed and Sealed this

Twenty-sixth Day of February, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,174,164 B1 | Page 1 of 1 |
| APPLICATION NO. | : 10/757612 | |
| DATED | : February 6, 2007 | |
| INVENTOR(S) | : Dale Knoop | |

It is certified that error appears in the above-identified patent and that said Letters Patent is hereby corrected as shown below:

On the title page, at item [54] and Column 1, line 3, delete "Cells" and add -- Calls --.

This certificate supersedes the Certificate of Correction issued February 26, 2008.

Signed and Sealed this

Eighteenth Day of March, 2008

JON W. DUDAS
*Director of the United States Patent and Trademark Office*